United States Patent [19]

Wronka et al.

[11] Patent Number: 5,054,033
[45] Date of Patent: Oct. 1, 1991

[54] TILTABLE ARC FURNACE

[75] Inventors: Bodo Wronka, Duisburg; Heinrich Schnitzer, Rheinberg, both of Fed. Rep. of Germany; Rolf Baare, Frederiksvaerk, Denmark; Hannsgeorg Bauer, Witten-Bommern; Josef Otto, Wetter, both of Fed. Rep. of Germany

[73] Assignee: Mannesmann AG, Duesseldorf, Fed. Rep. of Germany

[21] Appl. No.: 563,678

[22] Filed: Aug. 3, 1990

Related U.S. Application Data

[63] Continuation of Ser. No. 915,895, Oct. 3, 1986, abandoned, Continuation of Ser. No. 549,816, Nov. 8, 1983, abandoned.

[30] Foreign Application Priority Data

Nov. 10, 1982 [DE] Fed. Rep. of Germany ....... 3241987

[51] Int. Cl.⁵ ............................................. F27B 14/02
[52] U.S. Cl. ........................................ 373/84; 266/44; 266/196; 266/271; 373/79
[58] Field of Search ..................... 373/84, 79; 164/133, 164/322, 337, 420; 266/227, 44, 196, 236, 240; 414/272, 597, 236, 598, 216, 601; 432/160, 157, 263; 210/399, 773; 222/164, 166, 595, 598–599, 604–605; 75/50

[56] References Cited

U.S. PATENT DOCUMENTS

| | | | |
|---|---|---|---|
| 39,372 | 8/1863 | Barkley | 414/216 |
| 2,039,738 | 5/1936 | Pugh | 164/337 |
| 2,218,171 | 10/1940 | Junghans | 164/420 |
| 2,268,482 | 12/1941 | Harvey | 222/599 |
| 3,181,845 | 5/1965 | Malm et al. | 432/157 |
| 3,354,939 | 11/1967 | Calderon | 266/236 |
| 3,655,176 | 4/1972 | Winkler et al. | 222/595 |
| 4,003,561 | 1/1977 | Cudby | 266/220 |
| 4,004,793 | 1/1977 | Gray | 266/236 |
| 4,033,564 | 7/1977 | Junghanns et al. | 432/157 |
| 4,138,022 | 2/1979 | Mockizuki et al. | 414/216 |
| 4,211,536 | 7/1980 | Hamilton | 266/271 |
| 4,219,188 | 8/1980 | Meier | 266/236 |
| 4,401,296 | 8/1983 | Ploetz et al. | 266/236 |
| 4,424,958 | 1/1984 | Bachmann | 266/271 |
| 4,466,104 | 8/1984 | Walzel | 373/84 |

FOREIGN PATENT DOCUMENTS

| | | | |
|---|---|---|---|
| 0662985 | 5/1963 | Canada | 373/79 |
| 1804007 | 10/1968 | Fed. Rep. of Germany. | |
| 2218398 | 9/1974 | France. | |
| 1033889 | 6/1966 | United Kingdom. | |
| 1581058 | 12/1980 | United Kingdom | 222/597 |
| 2102544 | 2/1983 | United Kingdom | 222/599 |
| 2110342 | 6/1983 | United Kingdom | 222/598 |

OTHER PUBLICATIONS

Giszczak, "Operating Experience with Resistant Rod Heated Holding Furnaces (Refractories and Slags)", Central Foundary Division, 1978, pp. 166–168.

Primary Examiner—Gregory D. Thompson
Attorney, Agent, or Firm—Ralf H. Siegemund

[57] ABSTRACT

A tiltable arc furnace vessel is provided with a projecting, bay-like extension having a discharge opening closable from the outside only by a pivotable plate; the bay-like extension has a bottom substantially in the same level as the bottom of the remainder of the vessel. The vessel as a whole is titable by a hydraulic drive over a relatively small angle.

3 Claims, 1 Drawing Sheet

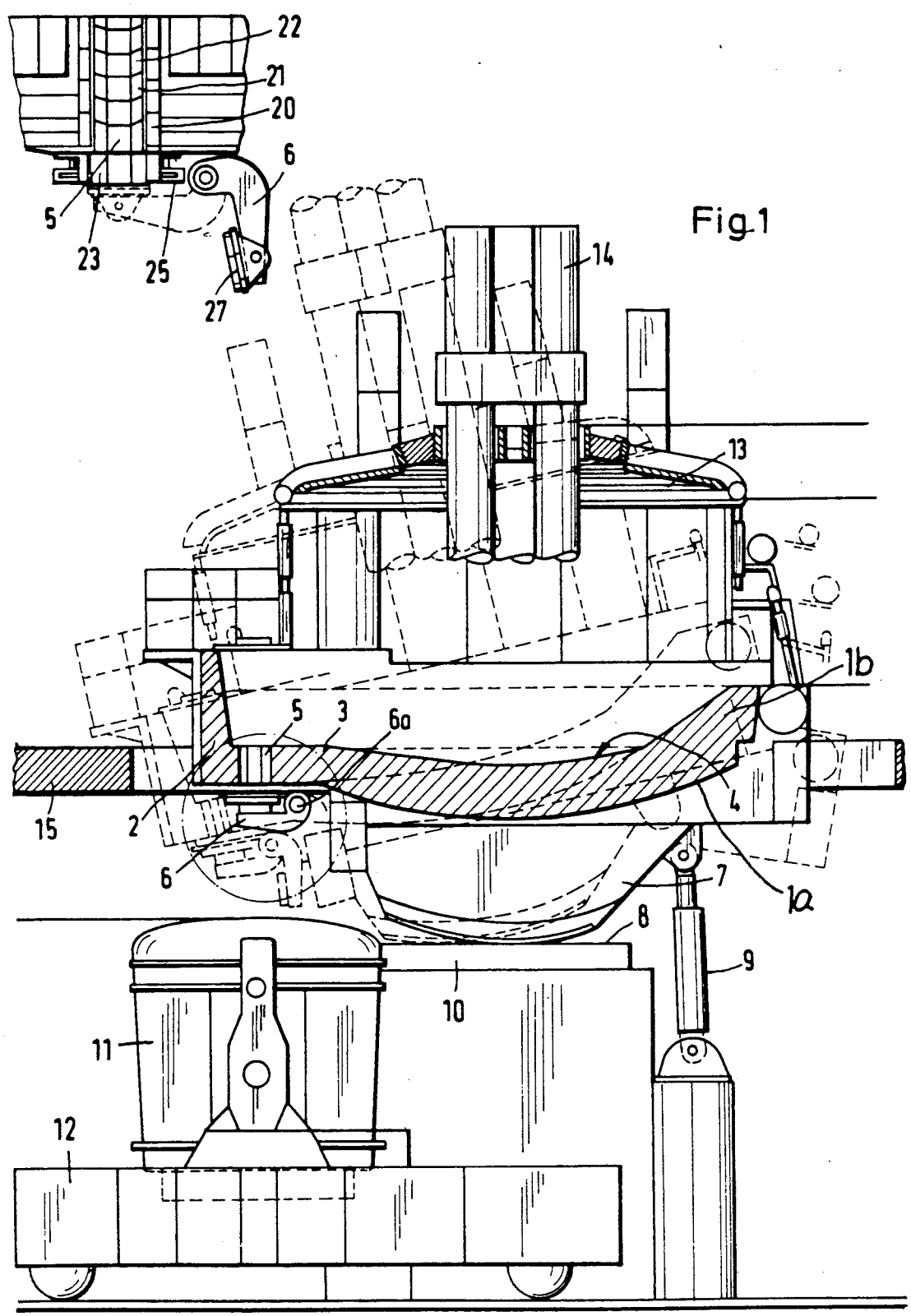

TILTABLE ARC FURNACE

This is a continuation of co-pending application Ser. No. 915,895, filed on Oct. 3, 1986, now abandoned and a continuation of Ser. No. 549,816, filed Nov. 8, 1983, now abandoned.

BACKGROUND OF THE INVENTION

The present invention relates to a tiltable arc furnace having a closable discharge opening in the bottom of a projecting bay-like part of the furnace vessel.

A furnace of the type to which the invention pertains is, for example, shown in German printed patent application 18 04 007. The construction chosen has the purpose of reducing the tilt angle of the receiving vessel during discharge of the furnace vessel. The conventional furnace construction with discharge spout requires the vessel to be lifted relatively high which in turn requires movement of considerable weight. In the example illustrated in FIG. 2 of the above identified publication, the tilt angle of the furnace is about 30° to 40.

the known furnace vessel as disclosed in the above identified German printed patent application exhibits a considerable level distance between the bay-like vessel part and the remaining bottom portion of that vessel. The same conditions prevail in the British patent 622,500. The German printed patent 29 44 269 does likewise show a particular bottom portion with discharge opening being situated considerably higher than the remaining vessel bottom. As a consequence of this kind of arrangement there will always be thin layer of molten metal to be discharged and being situated above the opening during the discharge procedure. This is true in spite of the still relatively large tilting angle. It was found in practice that eddys are formed within this thin metal layer and part of the slag is sucked into the eddy and discharged with the molten metal. This is turn deteriorates the quality of the discharged material.

In addition to the drawbacks outlined above, the known furnaces with a bay-like portion of the vessel with discharge opening are endowed with another considerable drawback: the discharge openings are usually closable by means of plugs which are situated within the vessel and are operated by means of rods which generally project in upward direction. Therefore, such a plug as well as the respective actuating rod are immediately exposed to the molted metal. Consequently, both the rod and the plug exhibit considerable wear. Maintenance of these parts is difficult because, as stated, the rod is run within the vessel and the plug is likewise situated therein. German printed patent application 29 44 269 attempted to covercome the problems of plug actuation by using a floating arrangement wherein the closing element floats on top of the metal bath. However, in view of the turbulence in the zone of the discharge opening, the desired and requisite separation of metal from slag was not achieved.

DESCRIPTION OF THE INVENTION

It is an object of the present invention to provide a new and improved arc furnace vessel in which in a relatively simple manner the requisite tilt angle of the vessel for discharge is reduced and the metal can be separated from the slag with a high degree of certainty. Moreover, the wear of the closing structure for the discharge opening should be reduced and its maintenance requirement should likewise be reduced.

It is therefore an object of the present invention to improve tiltable arc furnaces in which a closable discharge opening is provided in the bottom of a projecting bay-like portion of the vessel but which overcomes the various drawbacks and deficiencies outlined above.

In accordance with the prefered embodiment of the present invention, it is suggested to provide a jacketed bay-like extension of the vessel which bay-like extension is closed on all sides (except for communication with the interior of the vessel proper) by jacket portions as well as lining portions of the vessel and that the bottom of this bay-like extension is at least approximately is the same level as the bottom of the remaining vessel. This kind of construction reduces, first of all, the requisite tilt angle for the furnace to a considerable extent, particularly when compared with the higher level bay-like extension of known furnaces. A method of using a vessel in accordance with the present invention is shown in U.S. Pat. No. 4,523,747 by some of us and others. This patent shows also a baylike extension in elevation.

Upon discharging the furnace vessel constructed in accordance with the present invention, one has to consider a first discharge phase in which the vessel remains upright. In view of the small level difference between the bottom of the bay-like projection and the principal vessel bottom, a relatively thick layer of molten metal prevails throughout and slag floats on top thereof. Of course, an eddy forms in the vicinity of the discharge opening but that eddy does not extend sufficiently high up and, therefore, will not suck slag towards the discharge opening. Consequently, the interface and here particularly the molten metal interface layer just underneath the slag and the corresponding interfacing slag layer are in a relatively quiet state and indeed, slag will not be sucked into the discharge opening.

In a subsequent phase of discharge the vessel will be tilted in slightly forward direction, for example by not more than 12°, so that a relatively thick layer of molten metal remains above the discharge opening even in this phase.

In a so-called "sump operational mode" generally, a residual portion of molten metal as well as the slag remains in the furnace vessel, and usually the furnace is returned to the upright position prior to the completion of the discharge operation. The slag residue remains and now the furnace can be charged anew with metal that is to be melted. During these sump mode operations it is generally customary to leave the slag in the furnace for about 5 melting runs. Presently, as the residual molten metal as well as the slag is to be discharged, the furnace will be tilted in the usual fashion in the direction of the discharge opening.

Another advantage of the furnace proposed here is to be seen in the fact that no plug element is needed within the molten metal nor is a plug actuating rod required. The discharge opening is closable from the outside only and the closing element experiences only very little wear. The maintenance therefore is considerably simpler and particularly the discharge duct made of a particular metal can be exchanged from the outside. Finally, more space is available in the upper, brick-lined part of the furnace vessel so that cooling structure can be accommodated here.

In order to increase the like of the structural parts in the vicinity of the discharge opening, it is further suggested in accordance with the concept of the present invention to fill the discharge duct penetrating the bottom of the bay-like oven part with a particular mass and material which avoids and prevents molten metal from entering the discharge opening, and will drop out upon opening the discharge opening from below.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is an axial section view through an arc furnace constructed in accordance with the preferred embodiment of the present invention for practicing the best made thereof; and FIG. 2 is an enlarged scale illustrating a discharge opening of the furnace vessel with the closure flap in accordance with FIG. 1.

DETAILED DESCRIPTION OF THE PREFERRED EMBODIMENT

Proceeding now to the detailed description of the drawings, FIG. 1 illustrates an arc furnace being basically comprised of a jacketed vessel 1 which is normally closed by means of a cover 13. The vessel includes an overall jacket, wall or shell portion, 1a, and a fireproof lining 1b. Electrodes 14 are run through the cover 13. The vessel 1 rests on a cradle or frame 7 which can be tilted for the purpose of tilting the vessel in its entirety. Accordingly, the cradle 7 is pivotably mounted in the furnace stand 15. The cradle 7 is operated for purposes of tilting by means of a hydraulic drive 9 which tilts the cradle and the vessel in what can be termed the forward direction. Thereupon, cradle 7 rolls on a surface plane 8 of a support structure 10. The cradle 7 is therefore of a curved configuration accordingly. The dashed lines in FIG. 1 refer to the tilted position.

The vessel 1 is provided with a bay-like projection or extension 2 which is closed on all sides except for communication with the interior of the vessel 1. The bay-like extension, as an extension, is configured in analogy to a bay-window. The elevational contour of this bay-like extension is depicted for example in the above mentioned patent (U.S. patent, Ser. No. 531,055). Reference numeral 4 denotes the bottom of the vessel proper and reference numeral 3 refers to a bottom portion of the vessel in the bay-like extension 2. These bottom parts merge, the merger involving, as clearly visible, the shell or jacket portions 1a and, specifically, the fireproof lining 1b, in that shell or jacket of the bottom of the vessel proper continues in the shell or jacket of the bottom 3 of the extension 2. The same is true regarding the fireproof lining. That bottom part 3 is provided with a discharge opening 5 which can be closed from outside by means of a closure plate 6. The configuration of such a bay-like extension is such that steel can flow towards the discharge opening in an unrestricted manner. This closure plate 6 is pivotably mounted in a bearing for pivoting about an axis 6a. The closure plate 6 is operated by means of a drive which is not illustrated. Not only is the closure plate 6 arranged on the outside of the vessel but the drive of that plate for actuation is likewise outside of the vessel interior.

Metal is discharged from the furnace vessel into a ladle 11 mounted on a carriage 12 which is provided with wheels for purposes of positioning the vessel 11 underneath the generally stationary furnace; following discharge of the furnace, the ladle 11 is removed by means of that carriage 12 which generally runs underneath the frame of platform 15.

FIG. 2 illustrates generally the discharge opening 5 in greater detail. The immediate vicinity of the discharge channel is established by lining with fireproof refractory bricks 20. The discharge channel contains a discharge duct 21 which is filled with a pourable material 22. This, of course, presupposes that the plate or flap 6 is closed. Moreover, the plate 6 is on an upper side provided with a graphite plate lining 27. FIG. 2, of course, illustrates the flap to be in an open position. During melting, flap or plate 6 is closed and prevents the nonsintering material 22 from escaping. The material 22 protects the discharge duct 21 from being penetrated by molten metal.

Upon discharging the furnace vessel plate 6 is pivoted away from the discharge opening 5 and the material 22 drops out. Accordingly, the molten metal can now pour into the ladle vessel 11. After the discharge process has proceeded to some extent, drive 9 lifts one side of the furnace vessel so as to tilt it by, say, not more than 12°. This way, a sufficiently high layer of molten metal remains above the discharge opening 5 so that any eddys that form in the vicinity thereof will not suck slag into the opening. In order to protect the vessel part in the vicinity of the discharge opening, a graphite layer 23 is provided on the outside of the vessel but on the vicinity of the opening 5. Moreover, a water cooling structure 25 is arranged in the vicinity of the discharge opening 5 and also on the outside of the bay-like extension.

The invention is not limited to the embodiments described above, but all changes and modifications thereof not constituting departures from the spirit and scope of the invention are intended to be included.

We claim:

1. Arc furnace having a tiltable vessel whose interior is provided with an extension, the vessel including the extension having a bottom, there being a discharge opening in a portion of the bottom in the extension, the improvement comprising:

the extension having a lined wall being a part of a lined wall and of an interior enclosing structure of the vessel and being a bay-like extension that is enclosed from above, from all sides as well as at the bottom in that the bottom of the vessel is continued into the extension but an interior of the extension being in unrestricted communication with the interior of the vessel, the vessel being higher than the bay-like extension, said extension providing for laterally unrestricted flow from the vessel interior towards the discharge opening;

the bottom portion of the extension being substantially at the same level as the remaining portion of the bottom of the vessel except for a slight concavity in a central portion of the bottom of the vessel;

the discharge opening being plugless in the interior of the vessel; and further including a closure plate linked to the bottom of the bay-like extension from the outside and provided for selective opening and closing of said discharge opening from the outside of the vessel.

2. Arc furnace as in claim 1, there being a pourable material in said opening during the melting process and being held therein by said closure plate as long as the plate closes the opening, upon opening of the closure plate the material pours out preceeding pouring of the molten material.

3. Arc furnace as in claim 1, said closure plate being pivotably linked to the bottom.

* * * * *